(12) United States Patent
Schubert et al.

(10) Patent No.: US 12,059,854 B2
(45) Date of Patent: Aug. 13, 2024

(54) MOLD CORE FOR PRODUCING A COMPONENT COMPOSED OF FIBER COMPOSITE MATERIAL

(71) Applicant: Airbus Operations GmbH, Hamburg (DE)

(72) Inventors: Konstantin Schubert, Hamburg (DE); Jochen Sievers, Hamburg (DE); Hauke Seegel, Hamburg (DE); Jan Looks, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 119 days.

(21) Appl. No.: 17/559,512

(22) Filed: Dec. 22, 2021

(65) Prior Publication Data

US 2022/0194028 A1    Jun. 23, 2022

(30) Foreign Application Priority Data

Dec. 23, 2020    (DE) .................... 10 2020 134 901.7

(51) Int. Cl.
*B29C 70/54*    (2006.01)
*B29C 70/46*    (2006.01)

(52) U.S. Cl.
CPC .............. *B29C 70/54* (2013.01); *B29C 70/46* (2013.01)

(58) Field of Classification Search
CPC ......... B29C 33/50; B29C 33/52; B29C 33/54; B29C 33/76; B29C 33/405; B29C 33/505; B29C 70/44; B29C 70/46; B29C 70/48; B29C 70/54
See application file for complete search history.

(56) References Cited

U.S. PATENT DOCUMENTS

| | | | | |
|---|---|---|---|---|
| 3,795,559 A | * | 3/1974 | Horn | ..................... B29C 33/505 156/173 |
| 5,152,860 A | * | 10/1992 | Grossman | ............. B29C 33/505 156/196 |
| 5,190,773 A | | 3/1993 | Damon | |

(Continued)

FOREIGN PATENT DOCUMENTS

| | | |
|---|---|---|
| DE | 22 48 358 A | 4/1973 |
| DE | 34 18 110 A1 | 11/1985 |

(Continued)

*Primary Examiner* — Jerzi H Moreno Hernandez
(74) *Attorney, Agent, or Firm* — KDW Firm PLLC (57) ABSTRACT

A mold core for producing a component of fiber composite material with a cavity makes a particularly simple and efficient demolding process possible by the mold core extending along a longitudinal axis and in the form of a hybrid core and which includes, viewed in a cross section perpendicular to the longitudinal axis, a first core portion and a second core portion, wherein the first core portion has a thickness that is substantially greater than a thickness of the second core portion. The first core portion is formed from a first material with high stiffness and low coefficient of thermal expansion, and the second core portion is formed from a second material that differs from the first material, and is configured such that, under predetermined conditions, its form changes in a predetermined manner such that removal of the mold core from a cavity in the cured component is made easier.

16 Claims, 4 Drawing Sheets

(56) References Cited

U.S. PATENT DOCUMENTS

| | | | | |
|---|---|---|---|---|
| 6,264,868 | B1* | 7/2001 | Marchant | B29C 33/52 264/257 |
| 8,734,704 | B2* | 5/2014 | Kunze | B29C 33/52 264/225 |
| 2009/0152775 | A1* | 6/2009 | Grankall | B29C 33/505 425/436 RM |
| 2009/0309264 | A1* | 12/2009 | Cavaliere | B29C 33/505 264/319 |
| 2010/0092708 | A1* | 4/2010 | Jacob | B29C 33/52 264/219 |
| 2011/0094663 | A1* | 4/2011 | Guille | B29C 33/485 156/242 |
| 2012/0097323 | A1* | 4/2012 | Nitsch | B29C 70/30 156/212 |
| 2015/0013883 | A1* | 1/2015 | Matsen | B29C 70/446 156/379.6 |
| 2018/0290404 | A1* | 10/2018 | Cai | B29C 70/34 |
| 2019/0118420 | A1* | 4/2019 | Hirabayashi | B29C 33/505 |
| 2020/0122362 | A1* | 4/2020 | Heath, III | B29C 33/505 |
| 2020/0180244 | A1 | 6/2020 | Shimizu et al. | |
| 2021/0323245 | A1* | 10/2021 | Lochner | B29C 33/52 |

FOREIGN PATENT DOCUMENTS

| | | | | |
|---|---|---|---|---|
| DE | 103 26 422 A1 | 1/2005 | | |
| DE | 10 2006 031 323 A1 | 1/2008 | | |
| DE | 10 2011 087 497 A1 | 6/2013 | | |
| DE | 102011087497 A1 | * 6/2013 | | B29C 70/086 |
| EP | 2 067 596 A1 | 6/2009 | | |

* cited by examiner

MOLD CORE FOR PRODUCING A COMPONENT COMPOSED OF FIBER COMPOSITE MATERIAL

CROSS-REFERENCE TO RELATED APPLICATION

This application claims priority to German Patent Application No. 10 2020 134 901.7 filed Dec. 23, 2020, the entire disclosure of which is incorporated by reference herein.

TECHNICAL FIELD

The disclosure herein relates to a mold core for producing a component composed of fiber composite material having a cavity, in particular an undercut cavity. The component can for example be a shell element, which is reinforced with supporting elements, for an aircraft structure and preferably be produced in a resin infusion process such as for example a resin transfer molding (RTM) process or resin infusion (RI) process. Further aspects of the disclosure herein relate to a molding apparatus comprising such a mold core and to a method for producing a component composed of fiber composite material using such a molding apparatus.

BACKGROUND

Known molding apparatuses usually comprise a mold part and a mold core. Mold cores are required in particular if the component to be produced has a complex shape and in particular has a cavity which cannot be filled by the mold part, the cavity for example being between supporting element and shell element or between two flanges of a supporting element in the case of a shell element reinforced with supporting elements. The mold part, also referred to as mold, usually has a mold surface which is intended to face towards and/or be in contact with the shell element to be produced and which comprises at least one preferably elongate recess for receiving a supporting element of the shell element to be produced. The mold core can comprise one or more core parts and is designed to be arranged in the cavity of the component, and in this case preferably in the recess of the shell element, and to support the supporting element on the shell element during the production process, in particular during the curing operation, when the supporting element of the shell element to be produced is arranged in the recess.

In the case of components with complex shapes, the removal of the component from the mold after the curing operation, in particular the removal of the mold core from the cavity, represents a particular challenge because the cavity often has an undercut. Such an undercut may either have been provided in the cavity from the outset or be produced after the curing operation as a result of residual stresses in the component, what is known as a "spring-in effect", as a result of which the wall of the cavity, such as for example the flange of a supporting element, presses on the mold core and retains it in the cavity. Due to the undercut, the mold core is thus retained in the cavity in a form-fitting or at least force-fitting manner and cannot be readily removed from the cavity for demolding purposes.

Various approaches to solving this problem are known from the prior art.

Soluble cores are one example for this. However, independently of material and solvent, the soluble cores are generally subject to restrictions with regard to the sizes that can be achieved on account of the limited stability of the materials used. For instance, it is for example not possible to use the product "AQUACORE", a qualified core material, as a core concept for large, thin cores because the overall size of the core pack, and thus its inherent weight in conjunction with small local thicknesses and the need to drape dry material over the cores, would easily lead to breakage of the cores.

Molten cores are another example. However, the molten cores are unfavourable for environmental and health reasons and cannot be used for all composite materials owing to temperature limitations.

Solid cores composed of metal or other stiff materials are another example. However, the solid cores are limited with respect to the undercuts that can be achieved and require complex core combinations in order to produce complex parts, it also being necessary to correct or compensate for the different coefficients of thermal expansion between core and component. In addition, effects such as the spring-in of angles composed of fiber composite material often lead to a further division of the cores being required in order to avoid jamming of the component on the core or of the core on the component, depending on the geometry. Experience has shown that these complex core arrangements cause numerous problems in series production due to the wear of the components involved and in particular due to the associated demolding work and the associated loading of relatively small core cross sections.

Flexible cores, for example composed of silicone, and also pressurized cores (for example omega hoses) and cores that are a combination of a pressure hose and a soluble filler or an evacuated hose with a sand-like filler are likewise restricted with regard to their stability, at least when they are large and used in a lay-up process.

The most common solution, metallic cores, in conjunction with the various requirements that have to be met to ensure the demoldability, leads to a large number of relatively small cores or core parts, which in turn require a high level of effort in terms of cleaning, storage, release agent application, etc.

SUMMARY

It is therefore an object of the disclosure herein to provide a mold core which can be used to overcome the above-described disadvantages and which in particular makes a particularly simple and efficient demolding process possible.

This object is achieved by a mold core disclosed herein. In particular, the object is achieved by a mold core for producing a component which is composed of fiber composite material and which has a cavity, preferably an undercut cavity. The component is preferably a shell element which is reinforced with supporting elements, wherein the cavity is provided for example between the supporting element and the shell element or between two flanges of a supporting element. In this context, a cavity is understood to mean a partially open hollow space such as a cutout, groove, depression or similar. The mold core preferably extends in an elongate manner along a longitudinal axis. The mold core is also in the form of a hybrid core and comprises, as viewed in a cross section perpendicular to the longitudinal axis, a first core portion and a second core portion. The first core portion and the second core portion or the boundary thereof preferably extend along the longitudinal axis, preferably from one end of the mold core to the opposite end. The first core portion is formed from a, preferably metallic, first material with high stiffness and low coefficient of thermal expansion, such as for example aluminum, steel or Invar. A high stiffness in this context is preferably a stiffness of at least 50 GPa, and a low coefficient of thermal expansion in this context is preferably a coefficient of thermal expansion of at most $5*10^-6$ 1/K in the temperature range of up to 400° C. customary for the manufacture of fiber composites, further preferably a coefficient of thermal expansion of at most $2*10^-6$ 1/K in the temperature range between 20° C. and 200° C. The second core portion is formed from a, preferably non-metallic, second material that differs from the first material, and is configured such that, under predetermined conditions, its form, including its state of matter, changes in a predetermined manner in such a way that removal of the mold core from a cavity in the cured component is made easier, in particular in comparison to a removal of the mold core without a change in form of the second core portion.

The disclosure herein thus addresses all the above-described problems and solves them by combining conventional, stiff metal cores that have the required stiffness and stability for the pre-assembly and handling of the core pack with the advantages of other core concepts. The stiff, preferably metallic skeleton allows the entire core pack to be fixed to one of the molds used, if desired, while the secondary material ensures the required surfaces in part during the curing operation, but permits simple demolding. The advantage of the disclosure herein is thus a simpler demolding operation, which allows more complex shapes to be produced industrially, combined with the possibility of using the cores as tools, for example during the preforming operation, without handling problems.

In a preferred embodiment, the first core portion is designed to be in contact with at least a first surface of the component to be produced when the mold core is arranged in the cavity for curing of the component. At the same time, the second core portion is designed to be in contact with at least a second surface, which differs from the first surface, of the component to be produced, preferably with two second surfaces lying perpendicularly or transversely with respect to one another. The first core portion preferably has a thickness perpendicular to the longitudinal axis that is substantially greater than the second core portion. In this way, the component can be supported sufficiently by the first core portion, while the second core portion makes demolding possible or makes it considerably easier.

In a further preferred embodiment, the first core portion and the second core portion are fixedly connected to one another, in particular fastened to one another. As a result, the mold core is of one-part form, and so the handling is simplified and the structural strength improved.

In this case, it is particularly preferred for the first core portion and the second core portion to be adhesively bonded to one another, in particular either adhesively bonded in a continuous manner or only at discrete locations. In this case, the contact surface of the first material can be roughened in order to increase the adhesion. Adhesive bonding is a particularly simple and effective form of connection.

In addition or alternatively, it is preferred for the first core portion and the second core portion to be connected to one another by preferably discrete mechanical fastening elements, such as for example screws, bolts, pins, latching elements or other form-fitting elements, which preferably produce a form-fitting engagement between the two core portions. A connection by such fastening elements is particularly suitable for not obstructing an expansion of the second material when there are differences in thermal expansion between the first and second materials.

In a preferred embodiment, the second material is soluble, in particular with the aid of a solvent. Examples of such a soluble material include various plastics and plastic-sand mixtures, such as for example SR-30 from the manufacturer Stratasys, and examples of an appropriate solvent include, depending on the respective soluble material, water, slightly basic NaOH solutions or special materially adapted chemicals. If the second material is soluble, the second core portion can be dissolved, i.e. liquefied, in a simple manner, as a result of which the form of the second core portion can change or the second core portion can be removed completely, with the result that the first core portion is sufficiently spaced apart from the wall of the cavity of the component so as to be able to remove the first core portion from the cavity in a simple manner.

In this case, it is particularly preferred for the second material to be soluble using a solvent which is preferably not aggressive in relation to the fiber composite material of the component to be produced. Examples of such a solvent include water and highly aqueous solutions, such as NaOH solutions, for instance. In addition or alternatively, it is also possible for the second portion of the mold core to be sealed in relation to the component or for the component to be sealed in relation to the second portion of the mold core in order to protect against solvent when the second material is being dissolved. In both cases, the material of the component is protected from being damaged by the solvent.

Here, it is further preferred for the first core portion to have a plurality of portion parts. In this case, the second material of the second core portion can cover or seal a gap between two portion parts of the first core portion. Alternatively or in addition, the second material of the second core portion can cover or seal a connecting element for connecting two portion parts of the first core portion. In this way, the second material fulfils a further function in addition to making the demolding easier.

In a further preferred embodiment, the second material has, at least in a direction transverse to the longitudinal axis, a coefficient of thermal expansion which is higher, preferably substantially higher, than the first material, preferably at least four times higher, further preferably at least ten times higher, most preferably at least twenty times higher. In particular or alternatively, the coefficient of thermal expansion of the second material is at least $20*10^-6$ 1/K, preferably at least $50*10^-6$ 1/K, further preferably at least $100*10^-6$ 1/K. This makes the demolding easier since the second core portion shrinks greatly during cooling and a gap is thus produced between the mold core and the surface of the component surrounding the cavity, which cancels any form-fitting or force-fitting engagement. At the same time, the component is sufficiently supported by the expanded second core portion during the curing at elevated temperature.

In this case, it is particularly preferred for the second material to be silicone rubber, preferably with or without reinforcements for generating various effective coefficients of thermal expansion in different directions. Alternatively, the second material can also be a high-temperature plastic, such as for example polyether ether ketone (PEEK). Alternatively, the second material can also be a steel frame with aluminum inserts. These materials all have a high coefficient of thermal expansion. Additional reinforcements or inserts can be used in order to adapt the coefficient of thermal expansion to particular requirements in a local or direction-dependent manner.

In this case, it is further preferred for the second core portion to have a plurality of preferably separate core parts which are arranged or fastened with a gap between one another on/to the first core portion. Here, the gap and the second material are adapted with regard to the coefficient of thermal expansion in such a way that when the mold core is being heated to a curing temperature of the component to be produced, the gap is closed in a stress-free manner or with a predetermined compressive stress on account of thermal expansion of the core parts. Such a predetermined compressive stress may for example be intended to exert a certain pressure on the component by the second core portion. On the other hand, given corresponding adaptation, it is also possible for just such a pressure to be avoided, though the gap is nevertheless closed.

In a preferred embodiment, the second material is a compacted granular material, such as for example a powder, sand or similar. Such a granular material can, on the one hand, assume a rigid form in the compacted state and thus support the component sufficiently, but can, on the other hand, also be deformed very easily in the non-compacted state in order to make the demolding easier.

In this case, it is particularly preferred for the compacted granular material to be formed by a granular material which has been enclosed in an envelope, preferably in a flexible envelope, such as for example a plastics envelope, and subjected to a vacuum, such that it assumes a rigid form. For demolding, this rigid form can be broken up again by opening or piercing the envelope, in order to be able to easily remove the mold core. This constitutes a particularly simple and effective possibility for compacting the granular material.

A further aspect of the disclosure herein relates to a molding apparatus for producing a component composed of fiber composite material with a cavity. The molding apparatus comprises a mold part having a mold surface for abutment against the component to be produced, and also a mold core according to one of the embodiments described above. The features and effects described above in conjunction with the mold core are vis-à-vis applicable and preferred also in conjunction with the molding apparatus.

Yet a further aspect of the disclosure herein relates to a method for producing a component composed of fiber composite material with a cavity, wherein the method comprises the following steps:

A molding apparatus according to one of the embodiments described above is provided. A preform of the component to be produced with a cavity is also provided, preferably composed of dry fibers or of pre-impregnated fibers.

The mold core is arranged in the cavity such that the surfaces of the preform which surround the cavity are supported by the mold core, wherein preferably the first core portion bears against at least a first surface of the preform and the second core portion bears against at least a second surface of the preform. The preform is arranged so as to be in contact with the mold surface of the mold part.

After this, the component, i.e. the preform, is cured to form a finished shell element. This preferably takes place with pressure and thermal treatment, preferably either in a closed tool, wherein the molding apparatus also comprises a counter mold part in addition to the mold part, or in an open tool, which comprises only the mold part and is positioned in an autoclave for curing. Curing in an oven under vacuum is also possible and preferred.

The cured component is subsequently removed from the mold, i.e. released and removed from the mold part. During or after this, the mold core is released from the cavity, which is made easier by a change in the form of the second core portion. This change in the form of the second core portion is preferably brought about either by dissolution of the second material, preferably using solvent, or by shrinkage of the second material during cooling or by breaking up the rigid form of the compacted granular material, preferably by elimination of the vacuum, for example by piercing the envelope.

The features and effects described above in conjunction with the mold core and the molding apparatus are vis-à-vis applicable and preferred also in conjunction with the present method.

In a preferred embodiment, the preform is formed from dry fibers, wherein, after the arranging of the preform together with the mold core on the mold surface of the mold part and before the curing, the preform is provided, in particular saturated, with resin. This is preferably performed by resin infusion or injection, for example in what is known as a resin infusion (RI) process or resin transfer molding (RTM) process. This constitutes a particularly simple and advantageous method when using thermosetting resin.

BRIEF DESCRIPTION OF THE DRAWINGS

Example embodiments of the disclosure herein will be explained in more detail below on the basis of a drawing, in which.

DETAILED DESCRIPTION

Figure 1A:
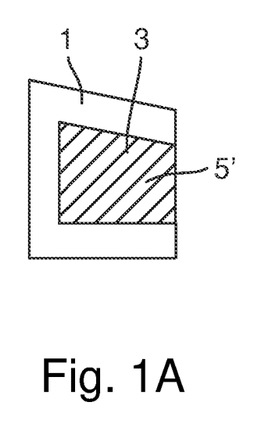
FIGS. 1A, 1B and 1C show a schematic cross-sectional view of components to be produced, which are supported with mold cores known from the prior art and with a mold core according to the disclosure herein.
Figure 1B:
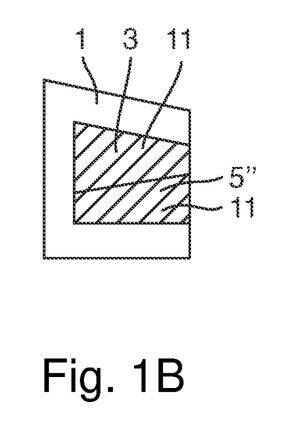
Figure 1C:
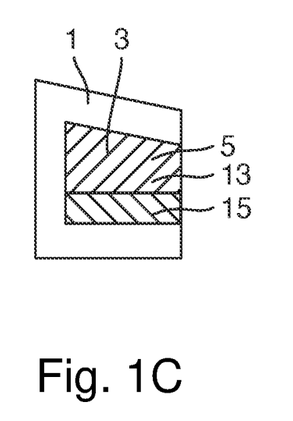

Three depictions of a component 1 composed of fiber composite material with an undercut cavity 3 are illustrated in FIGS. 1A, 1B and 1C, wherein the component 1 for production in an RTM process in FIG. 1A) is supported with a homogeneous solid mold core 5' known from the prior art, wherein the component 1 in FIG. 1B) is supported with a two-part mold core 5" known from the prior art, and wherein the component in FIG. 1C) is supported with a mold core 5 according to the disclosure herein in the form of a hybrid core. As is readily apparent, the solid mold core 5' in FIG. 1A) can only be removed with a great deal of difficulty on account of the undercut of the cavity 3. In the prior art, use is therefore frequently made of the two-part mold core 5" shown in FIG. 1B), in the case of which both halves 11 can be removed individually, but this is cumbersome in terms of production, assembly and handling and also disadvantageous on account of a high level of wear. The mold core 5 according to the disclosure herein, which is illustrated in FIG. 1C) and formed as a hybrid core having a first core portion 13 composed of a first material and a second core portion 15 composed of a second material, makes the demolding easier due to a change in form of the second core portion 15, as will be described in more detail below in conjunction with FIGS. 2 and 3, and therefore constitutes a particularly simple and efficient alternative to the known mold cores 5', 5".

Figure 2:
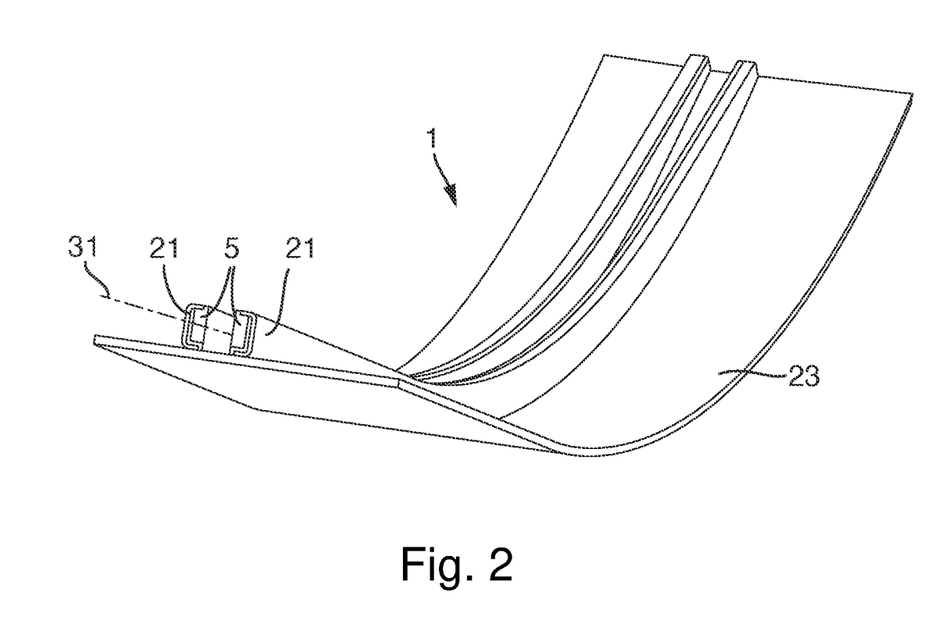
FIG. 2 shows a perspective view of a component to be produced in the form of a shell element reinforced with supporting elements, the supporting elements being supported with mold cores according to the disclosure herein.
Figure 3:
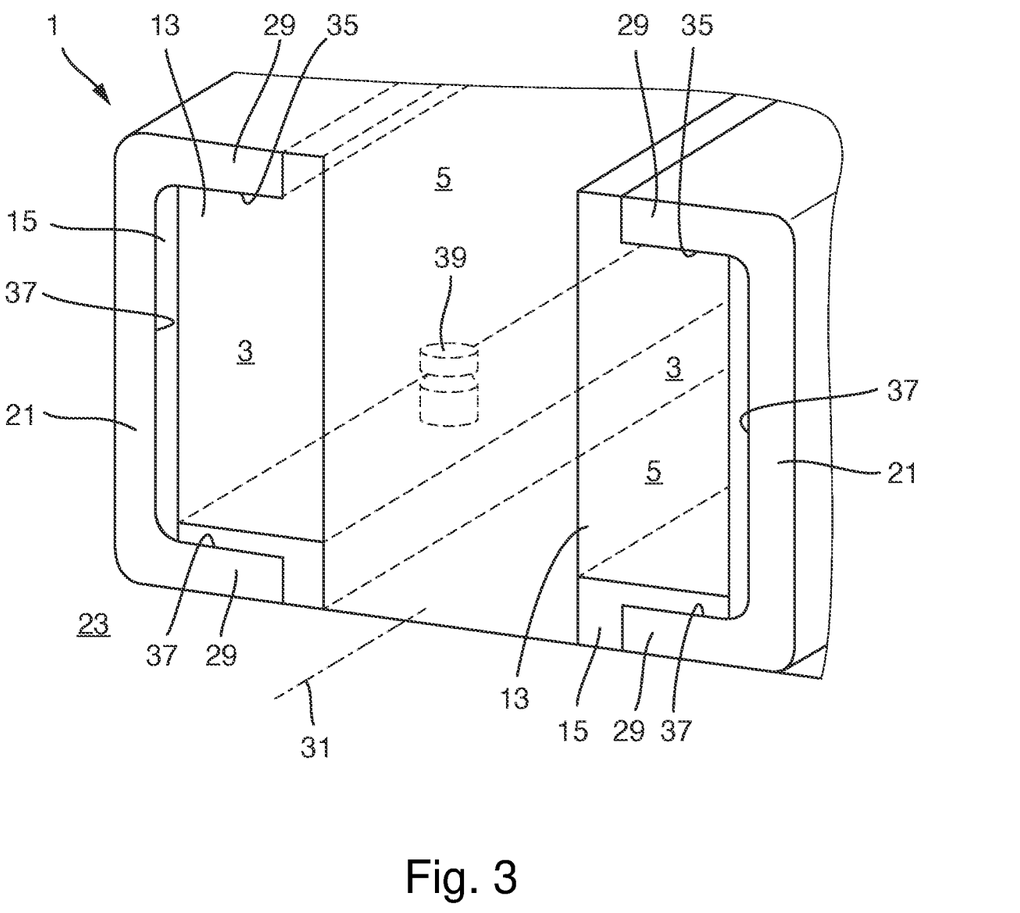
FIG. 3 shows a perspective detail view of the cross section of the component from FIG. 2.

FIGS. 2 and 3 illustrate a further component 1, in the present example embodiment a shell element 23 of an aircraft structure, the shell element being provided with supporting elements 21 and being produced in an RTM process. The supporting elements 21 are formed as C-profile carriers and have a cavity 3 between the two flanges 29 of each supporting element 21, a corresponding mold core 5 being arranged in the cavity. The mold core 5 extends in an elongate manner along a longitudinal axis 31. The mold core 5 is also in the form of a hybrid core and comprises, as viewed in a cross section perpendicular to the longitudinal axis 31, a first core portion 13 and a second core portion 15. The first core portion 13 and the second core portion 15 extend along the longitudinal axis 31. The first core portion 13 is formed from a metallic first material with high stiffness and low coefficient of thermal expansion, in the present example embodiment Invar 36. This has a stiffness of approximately 141 GPa and a coefficient of thermal expansion of $1*10^-6$ 1/K to $4*10^-6$ 1/K in the temperature range of interest of between 20° C. and 200° C. The second core portion 15 is formed from a non-metallic second material that differs from the first material, and is configured such that, under predetermined conditions, its form, including its state of matter, changes in a predetermined manner in such a way that removal of the mold core 5 from a cavity 3 in the cured component 1 is made easier in comparison to a removal of the mold core 5 without a change in form of the second core portion 15.

As illustrated in FIG. 3, the first core portion 13 is designed to be in contact with at least a first surface 35 of the component 1 to be produced when the mold core 5 is arranged in the cavity 3 for curing of the component 1. At the same time, the second core portion 15 is designed to be in contact with at least a second surface 37, which differs from the first surface 35, of the component 1 to be produced, in particular with two second surfaces 37 lying perpendicularly or transversely with respect to one another. In this case, the first core portion 13 has a thickness perpendicular to the longitudinal axis 31 that is substantially greater than the second core portion 15.

As likewise illustrated in FIG. 3, the first core portion 13 and the second core portion 15 are fixedly connected to one another. In particular, the first core portion 13 and the second core portion 15 are adhesively bonded to one another and additionally connected to one another by discrete mechanical fastening elements 39 in the form of bolts, which produce a form-fitting engagement between the two core portions 13, 15.

In the example embodiment shown in FIGS. 2 and 3, the second material is soluble, in particular a soluble plastic, specifically with the aid of a solvent which is not aggressive in relation to the fiber composite material of the component 1 to be produced, for example water. By virtue of the fact that the second material is soluble, the second core portion 15 can be dissolved, i.e. liquefied, in a simple manner, as a result of which the form of the second core portion 15 can change or the second core portion 15 can be removed completely, with the result that the first core portion 13 is sufficiently spaced apart from the wall of the cavity 3 of the component 1 so as to be able to remove the first core portion from the cavity 3 in a simple manner.

Figure 4A:
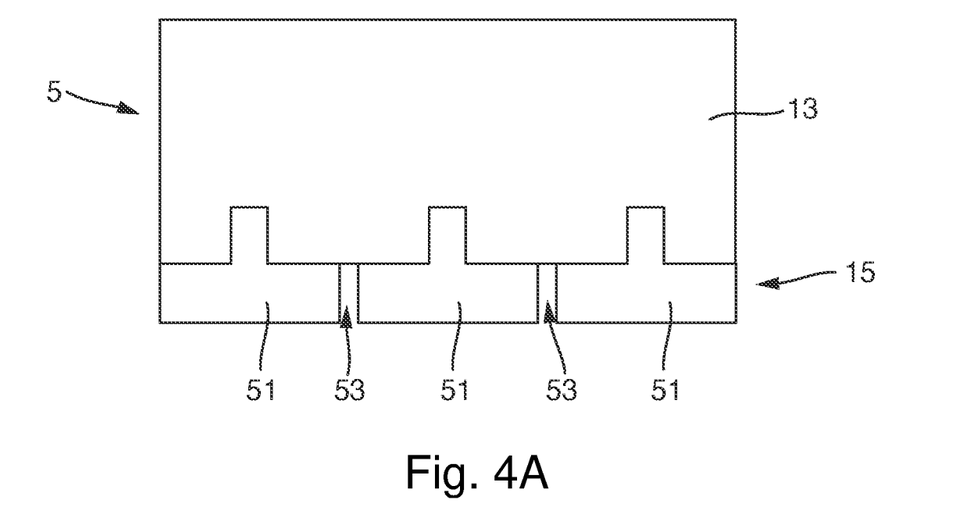
FIGS. 4A and 4B show a schematic cross-sectional view of a mold core according to an embodiment of the disclosure herein in a cooled and heated state.
Figure 4B:
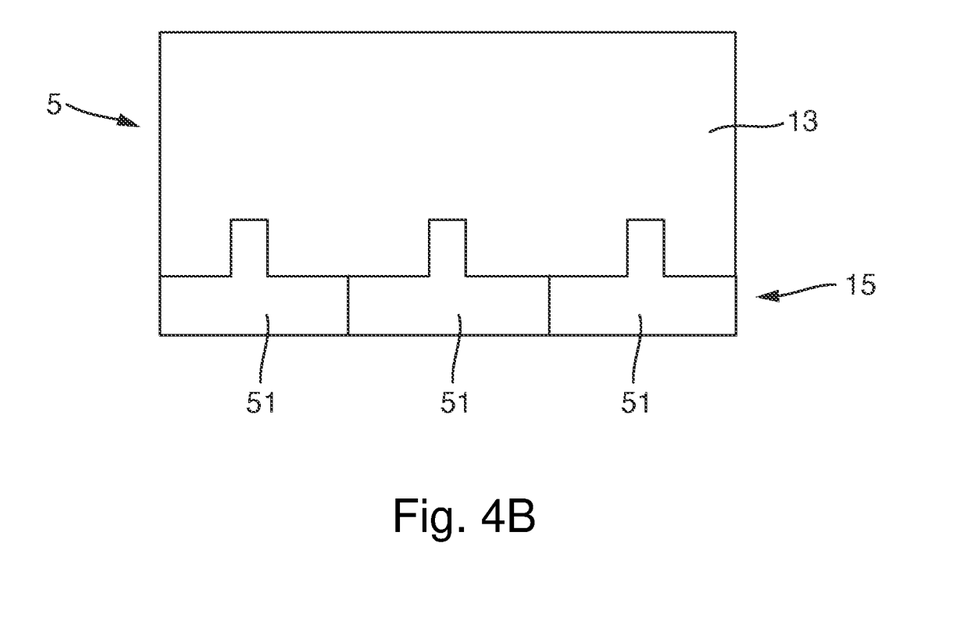

As an alternative to the soluble second material described above, the second material can also have, at least in a direction transverse to the longitudinal axis 31, a substantially higher coefficient of thermal expansion than the first material, referring to FIGS. 4A and 4B. In the present example embodiment of FIGS. 4A and 4B, the second material is silicone rubber with reinforcements for generating various effective coefficients of thermal expansion in different directions, such that the coefficient of thermal expansion of the second material transverse to the longitudinal axis 31 is at least twenty times higher than the coefficient of thermal expansion of the first material. This makes the demolding easier since the second core portion 15 shrinks greatly during cooling and a gap is thus produced between the mold core 5 and the surface of the component 1 surrounding the cavity 3, which cancels any form-fitting or force-fitting engagement. At the same time, the component 1 is sufficiently supported by the expanded second core portion 15 during the curing at elevated temperature.

As likewise shown, the second core portion 15 has a plurality of separate core parts 51 which are arranged with a gap 53 between one another on the first core portion 13 ((see FIG. 4A) in a cold state). Here, the gap 53 and the second material are adapted with regard to the coefficient of thermal expansion in such a way that when the mold core 5 is being heated to a curing temperature of the component 1 to be produced, the gap 53 is closed in a stress-free manner or with a predetermined compressive stress on account of thermal expansion of the core parts 51 (see FIG. 4B). Such a predetermined compressive stress may for example be intended to exert a certain pressure on the component 1 by the second core portion 15. On the other hand, given corresponding adaptation, it is also possible for just such a pressure to be avoided, though the gap 53 is nevertheless closed.

As a third alternative, the second material can also be formed as a compacted granular material, such as for example a powder, sand or similar. Such a granular material can, on the one hand, assume a rigid form in the compacted state and thus support the component 1 sufficiently, but can, on the other hand, also be deformed very easily in the non-compacted state in order to make the demolding easier. The compacted granular material is in particular compacted by being enclosed in a flexible envelope and being subjected to a vacuum, such that it assumes a rigid form. For demolding, this rigid form can be broken up again by opening or piercing the envelope, in order to be able to easily remove the mold core 5.

Figure 5A:
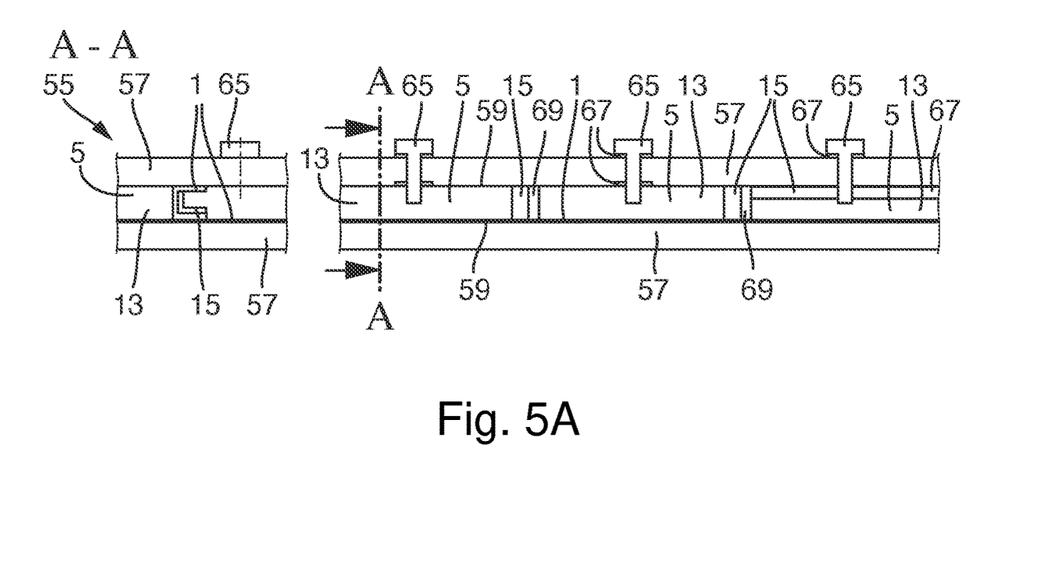
FIGS. 5A and 5B show a schematic cross-sectional view of a molding apparatus with component and mold core arranged therein according to an embodiment of the disclosure herein in a cooled and heated state.
Figure 5B:
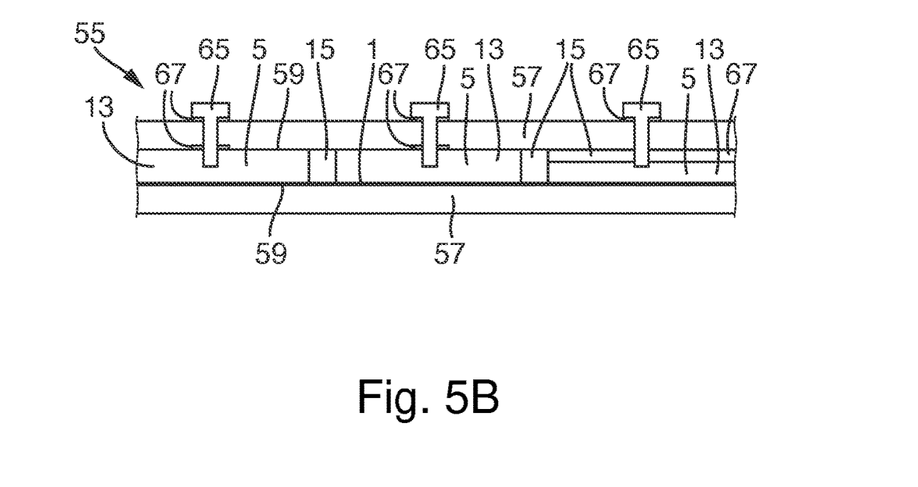

A molding apparatus 55 for producing a component 1 composed of fiber composite material is illustrated in FIGS. 5A and 5B. The molding apparatus 55 comprises a mold part 57 having a mold surface 59 for abutment against the component 1 to be produced, and also a mold core 5 comprising a second core portion 15 composed of a second material with a particularly high coefficient of thermal expansion in comparison to the first material, as described further above. In particular, FIGS. 5A and 5B show an example application of the concept of different coefficients of thermal expansion in component 1, mold part 57 and mold cores 5: a mold part 57 with low coefficient of thermal expansion contains a component 1 and mold cores 5 comprising a second core portion 15 composed of a second material with relatively high coefficient of thermal expansion. Depending on the geometry, mold cores 5 with high coefficient of thermal expansion cannot be fixed against the outer mold part 57, in order to avoid stresses during heating, but the described concept can be used to fasten all the individual mold cores 5 to the mold part 57, for example by screws 65 and a corresponding seal 67 in the cold state, wherein the intermediate spaces 69 are filled by the second material of the second core portion 15 with high coefficient of thermal expansion when the temperature is increased (FIG. 5B). The high coefficient of thermal expansion can also act in parallel as the seal 67, as illustrated, and can also be used to make the demolding easier in accordance with the mechanisms described above, as is apparent for example in detail A-A which shows a cross section.

By the above-described molding apparatus 55 and the above-described mold part 57, a component 1 composed of fiber composite material with a cavity 3 can be produced in an RTM process in the following manner:

A molding apparatus 55 according to one of the embodiments described above is provided. A preform, which is composed of dry fibers, of the component 1 to be produced with a cavity 3 is also provided.

The mold core 5 is arranged in the cavity 3 such that the portions of the preform which surround the cavity 3 are supported by the mold core 5, wherein the first core portion 13 bears against at least a first surface 35 of the preform and the second core portion 15 bears against at least a second surface 37 of the preform. The preform is arranged so as to be in contact with the mold surface 59 of the mold part 57.

After this, the component 1, i.e. the preform, is cured to form a finished component 1. This takes place with pressure and thermal treatment in a closed tool, i.e. in a closed molding apparatus 55, which also comprises a corresponding closing counter mold part in addition to the mold part 57.

The cured component 1 is subsequently removed from the mold, i.e. released and removed from the mold part 57. During or after this, the mold core 5 is released from the cavity 3, which is made easier by a change in the form of the second core portion 15. This change in the form of the second core portion 15 is brought about, as described further above, either by dissolution of the second material, preferably using solvent, or by shrinkage of the second material during cooling or by breaking up the rigid form of the compacted granular material by elimination of the vacuum, for example by piercing the envelope.

The above-described disclosure herein thus makes it possible to achieve simpler demolding of the mold cores 5, which allows more complex shapes to be produced industrially, combined with the possibility of using the mold cores 5 as tools without handling problems.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A mold core for producing a component comprising fiber composite material having a cavity, comprising:
   the mold core extending along a longitudinal axis;
   wherein the mold core is in a form of a hybrid core and comprises, as viewed in a cross-section perpendicular to the longitudinal axis, a first core portion and a second core portion, wherein the first core portion and the second core portion are fixedly connected to one another;
   the first core portion comprising a first material with a first coefficient of thermal expansion; and
   the second core portion comprising a second material that differs from the first material, and is configured such that, under predetermined conditions, its form changes in a predetermined manner such that removal of the mold core from the cavity in the component is easier;
   wherein the second material has, at least in a direction transverse to the longitudinal axis, a second coefficient of thermal expansion that is greater than the first coefficient of thermal expansion; and
   wherein the first core portion has a thickness perpendicular to the longitudinal axis that is substantially greater than a thickness of the second core portion.

2. The mold core according to claim 1, wherein the first core portion is in contact with at least a first surface of the component to be produced, and
   wherein the second core portion is in contact with at least a second surface of the component to be produced.

3. The mold core according to claim 1, wherein the first core portion and the second core portion are adhesively bonded to one another.

4. The mold core according to claim 1, wherein the first core portion and the second core portion are connected to one another by mechanical fastening elements.

5. The mold core according to claim 1, wherein the second material is soluble.

6. The mold core according to claim 5, wherein the second material is soluble using a solvent which is not aggressive in relation to the fiber composite material of the component to be produced.

7. The mold core according to claim 5, wherein the first core portion has a plurality of portion parts,
   wherein the second material of the second core portion covers or seals a gap between two portion parts of the first core portion, and/or
   wherein the second material of the second core portion covers or seals a connecting element for connecting two portion parts of the first core portion.

8. The mold core according to claim 1, wherein the second coefficient of thermal expansion of the second material is at least four times higher than the first coefficient of thermal expansion of the first material.

9. The mold core according to claim 1, wherein the second material is silicone rubber with or without reinforcements, or
   wherein the second material is a plastic, or
   wherein the second material is a steel frame with aluminum inserts.

10. The mold core according to claim 1, wherein the second core portion has a plurality of core parts arranged with a gap between one another on the first core portion, and
    wherein the gap and the second material are configured such that when the mold core is being heated to a curing temperature of the component to be produced, the gap is closed in a stress-free manner or with a predetermined compressive stress on account of thermal expansion of the core parts.

11. The mold core according to claim 1, wherein the second material is a compacted granular material.

12. The mold core according to claim 11, wherein the compacted granular material comprises a granular material which has been enclosed in an envelope and subjected to a vacuum.

13. The mold core according to claim 1, wherein the second coefficient of thermal expansion of the second material is at least ten times higher than the first coefficient of thermal expansion of the first material.

14. The mold core according to claim 1, wherein the second coefficient of thermal expansion of the second material is at least twenty times higher than the first coefficient of thermal expansion of the first material.

15. A molding apparatus for producing a component comprising fiber composite material having a cavity, comprising:
   a mold part having a mold surface for abutment against the component to be produced; and
   a mold core according to claim 1.

16. A method for producing a component comprising fiber composite material having a cavity, wherein the method comprises:
   providing a molding apparatus for producing the component, the molding apparatus comprising:
      a mold part having a mold surface for abutment against the component to be produced; and
      a mold core for producing the component, comprising:
         the mold core extending along a longitudinal axis;
         wherein the mold core is in a form of a hybrid core and comprises, as viewed in a cross-section perpendicular to the longitudinal axis, a first core portion and a second core portion, the first core portion and the second core portion being fixedly connected to one another;
         the first core portion comprising a first material with a first coefficient of thermal expansion; and
         the second core portion comprising a second material that differs from the first material, and is configured such that, under predetermined conditions, its form changes in a predetermined manner such that removal of the mold core from the cavity in the component is easier;
         wherein the second material has, at least in a direction transverse to the longitudinal axis, a second coefficient of thermal expansion that is greater than the first coefficient of thermal expansion; and
         wherein the first core portion has a thickness perpendicular to the longitudinal axis that is substantially greater than a thickness of the second core portion;
   providing a preform of the component to be produced comprising a cavity;
   arranging the mold core in the cavity such that the surfaces of the preform which surround the cavity are supported by the mold core;
   arranging the preform on the mold surface of the mold part;
   curing the component;
   releasing the component from the mold part; and
   releasing the mold core from the cavity in a manner made easier or made possible by a change in the form of the second core portion.

* * * * *